(12) United States Patent
Rimington et al.

(10) Patent No.: US 6,199,827 B1
(45) Date of Patent: Mar. 13, 2001

(54) EXPANDABLE LIFTING DEVICES AND VALVE ASSEMBLIES FOR SUCH LIFTING DEVICES

(75) Inventors: Richard M Rimington, Powys; Richard E Fletcher, Herefordshire, both of (GB)

(73) Assignee: Mangar International Limited, Powys (GB)

( * ) Notice: Subject to any disclaimer, the term of this patent is extended or adjusted under 35 U.S.C. 154(b) by 0 days.

(21) Appl. No.: 09/216,912

(22) Filed: Dec. 21, 1998

Related U.S. Application Data

(63) Continuation of application No. PCT/GB97/01583, filed on Jun. 13, 1997.

(30) Foreign Application Priority Data

Jun. 21, 1996 (GB) .................................................. 9613077

(51) Int. Cl.⁷ ...................................................... B66F 3/24
(52) U.S. Cl. ...................................................... 254/93 HP
(58) Field of Search ........................... 254/93 HP, 93 R, 254/89 H; 92/90, 92, 93, 94, 35

(56) References Cited

U.S. PATENT DOCUMENTS

| | | | |
|---|---|---|---|
| 4,275,869 | * | 6/1981 | Clements ........................ 254/93 HP |
| 5,669,086 | * | 9/1997 | Garman ........................... 254/93 HP |

FOREIGN PATENT DOCUMENTS

| | | |
|---|---|---|
| 655 368 | 1/1938 | (DE) . |
| 1 217 571 | 5/1966 | (DE) . |
| 087 620 | 9/1983 | (EP) . |
| 618 108 | 10/1994 | (EP) . |
| 2 599 110 | 11/1987 | (FR) . |
| 2 286 430 | 8/1995 | (GB) . |

OTHER PUBLICATIONS

Bek. gem. Jul. 30, 1964 Nr. 1 897 870, Dr. Walter andrejewski Patentanwalt, P.A. 328923*–8.5.64, pp. 1–8.

* cited by examiner

Primary Examiner—Robert C. Watson
(74) Attorney, Agent, or Firm—Pillsbury Madison & Sutro LLP

(57) ABSTRACT

A valve assembly having a rigid mounting and a valve member located in an opening in the mounting wherein an annular part of the mounting around the opening provides a first valve seat on one side thereof and a second valve seat on the other side; wherein the valve member includes a first head joined to a second head by a neck which extends through the aperture; wherein the first head has a resilient flange which resiliently engages the first valve seat to form a first valve and the second head has a resilient flange which resiliently engages the second seat to form a second valve; and wherein the flange of the second head has an actuator formation thereon which is movable to move at least part of this flange off the second seat whereby, in use, to allow fluid under pressure to flow past this flange into the opening for automatically lifting the flange of the first head off the first seat when the fluid pressure in the opening is greater than the fluid pressure at said one side of the mounting.

9 Claims, 1 Drawing Sheet

U.S. Patent

Mar. 13, 2001

US 6,199,827 B1

EXPANDABLE LIFTING DEVICES AND VALVE ASSEMBLIES FOR SUCH LIFTING DEVICES

Figure 1:
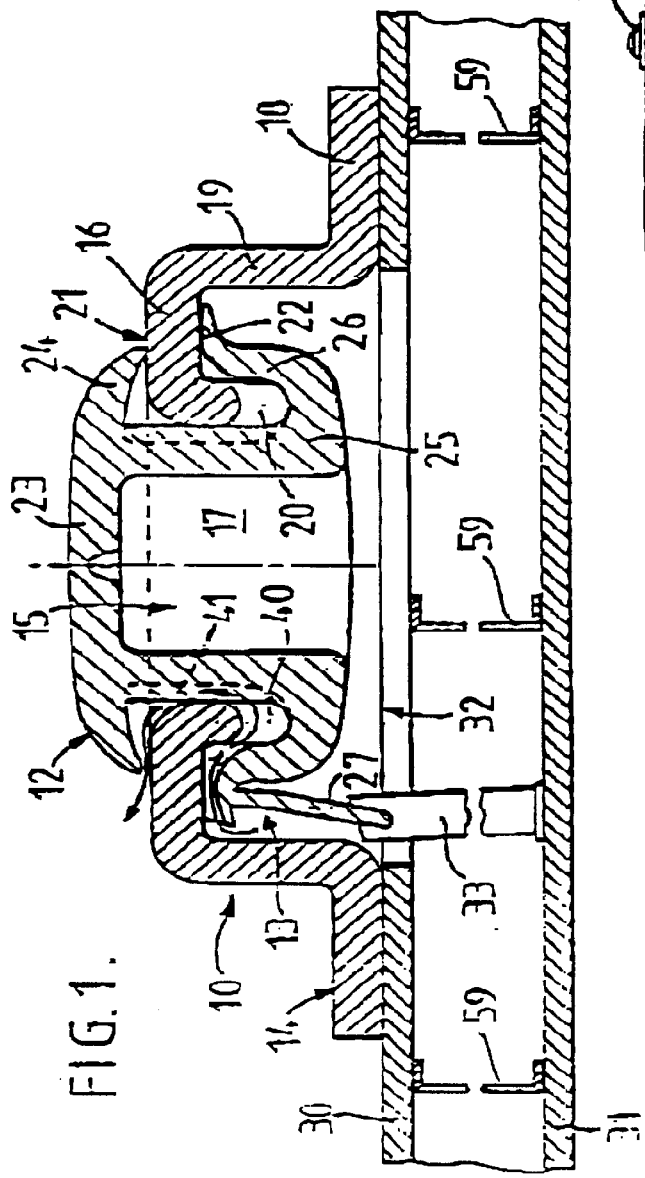

This is a continuation of International Appln. No. PCT/GB97/01583 filed Jun. 13, 1997 which designated the U.S.

Pneumatically inflatable, and hydraulically expandable lifting bags are known which bags include air or water inlet valves and/or air or water outlet valves for, for example, inflation or expansion of the bags, deflation or expansion of the bags, maintaining the bags in an inflated or expanded condition, and/or preventing the bags being subjected to excessive pressures.

DE-U-1,897,870 discloses an extendable or inflatable lifting device having a pressure release valve assembly; wherein the device comprises an enclosure having a first part movable relative to second part by applied fluid pressure; wherein the valve assembly is mounted on one of the parts and comprises a valve exposed to pressure inside the enclosure and is attached to and actuable by an actuating tether which is located in the enclosure and is attached to the other of said parts to cause the valve to open and release fluid from within the enclosure when the distance between the parts reaches a limit determined by the length of the tether.

Sometimes such valves fail to operate correctly, because of contamination, giving rise to operational problems. These problems are particularly prevalent in the case of outlet valves such as mechanically actuated outlet valves which can fail to close properly giving rise to unwanted fluid release, e.g. deflation of the bags, or preventing proper expansion or inflation of the bags.

In order to enable the risk of such problems arising the present invention generally provides an extendable or inflatable lifting device having a pressure release valve assembly; wherein the device comprises an enclosure having a first part movable relative to second part by applied fluid pressure; wherein the valve assembly is mounted on one of the parts and comprises a valve exposed to pressure inside the enclosure and is attached to and actuable by an actuating tether which is located in the enclosure and is attached to the other of said parts to cause the valve to open and release fluid from within the enclosure when the distance between the parts reaches a limit determined by the length of the tether; and characterised in that the valve which is actuated by the tether is a second valve of the assembly which second valve releases fluid into the valve assembly to actuate a first valve which first valve is arranged to open automatically only when the pressure within the valve assembly is greater than the pressure outside the enclosure.

In a particular embodiment the invention provides a pneumatically inflatable lifting device having an air release valve assembly; wherein the valve assembly further comprises a rigid mounting and a valve member is located in an opening in the mounting; wherein an annular part of the mounting around the opening provides a first valve seat on one side thereof and a second valve seat on the other side thereof; wherein the valve member comprises a first head joined to a second head by a neck which extends through the aperture; wherein the first head has a resilient flange which resiliently engages the first valve seat to form said first valve and the second head had a resilient flange which resiliently engages the second seat to form the second valve; and wherein the flange of the second head has an actuator formation thereon which is movable by the actuator to move at least part of this flange off the second seat whereby, in use, to allow fluid under pressure to flow past this flange into the opening for automatically lifting the flange of the first head off the first seat when the fluid pressure in the opening is greater than the fluid pressure at said one side of the mounting.

In many instances the enclosure will be a bag having flexible panels, but it could, for example, be a bellows having rigid panels.

The first valve, by opening only when the pressure inside the valve assembly is greater than the pressure outside the bag (hereinafter referred to as a "positive pressure differential"), ensures that contamination cannot enter the valve assembly from outside the device irrespective of the operational state of the expansion or inflation limiting second valve.

The valve assembly preferably also serves as an emergency or safety pressure release valve in the event of the second valve not functioning, e.g. due to the tether breaking, by allowing both valves to be opened forcibly by excessive pressure.

The valve assembly preferably comprises a valve member which is common to both valves and provides two independently movable parts, e.g. flanges, each of which form a part of one or other of the valves.

The valve member can preferably be expelled or partially expelled from the valve assembly by excessive differential pressure within the enclosure. Alternatively, the valve member includes a frangible diaphragm which ruptures when subjected to an excessive pressure differential.

The invention further provides a valve assembly comprising a rigid mounting and a valve member located in an opening in the mounting wherein an annular part of the mounting around the opening provides a first valve seat on one side thereof and a second valve seat on the other side; wherein the valve member comprises a first head joined to a second head by a neck which extends through the aperture; wherein the first head has a resilient flange which resiliently engages the first valve seat to form a first valve and the second head has a resilient flange which resiliently engages the second seat to form a second valve; and wherein the flange of the second head has an actuator formation thereon which is movable to move at least part of this flange off the second seat whereby, in use, to allow fluid under pressure to flow past this flange into the opening for automatically lifting the flange of the first head off the first seat when the fluid pressure in the opening is greater than the fluid pressure at said one side of the mounting.

The pressure exerted by the first head on the first seat is preferably substantial so that a considerable minimum positive pressure differential across the first valve is necessary before the valve will open, and so that when the differential falls to or below said minimum positive pressure differential said first valve closes automatically to retain pressure within the opening (i.e. between the valves) even when the second valve is open, whereby to maintain the inflated shape of the bag, and so that when a load is applied to the device, the amount of further inflation required is reduced.

Figure 2:
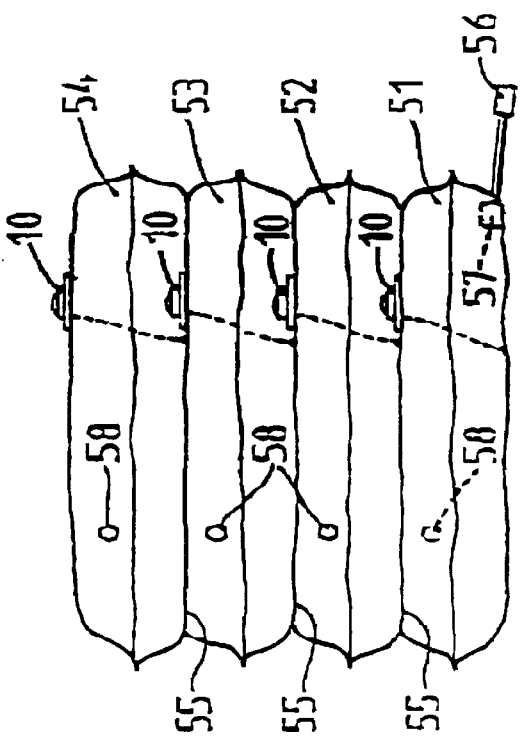

The invention will be described further, by way of example, with reference to the accompanying diagrammatic drawings, wherein:

FIG. 1 is a cross-sectional view through a valve assembly of the invention in which the right hand half shows the assembly in a "valve-closed" condition, and the left hand half shows the assembly in a "valve-open" condition; and FIG. 2 is a diagram of a lifting device, comprising a stack of bags, of the invention.

Referring to FIG. 1, the valve assembly 10 comprises a first valve 12 and a second valve 13 having a common rigid mounting 14 and a common elastomeric valve member 15.

The mounting 14 includes an annular part 16 around an opening occupied by a neck 17 of the valve member; which annular part 16 is peripherally joined to a planar mounting flange 18 by a cylindrical wall 19, and has an axially castellated cylindrical inner flange 20 around said opening.

One side of the annular part 16 provides a seat 21 of the first valve 12, and the other side provides a seat 22 for the second valve 13.

The valve member 15 provides a first, solid, head 23 at one end of the neck 17, which head has a flange 24 which bears against the seat 21 to form the first valve; and a second, hollow head 25 at the other end of the neck, which head has a cranked flange 26 which bears against the seat 22 to form the second valve 13. The flange 26 has an actuator formation 27 thereon, to which tension can be applied to pull the flange off the seat 22.

The neck 17 is hollow and is radially castellated.

The valve assembly is intended to be mounted on one of two mutually confronting panels 30,31 of a pneumatically inflatable lifting bag (or bellows), e.g. as indicated in FIG. 1 in which the flange 18 is bonded to the panel 30 around a hole 32 therein. An inelastic flexible tether 33 is connected to the other panel 31 and to the formation 27, so that when the bag is inflated to separate the panels, the tether becomes taut, and, when the tension applied by the tether to the formation 27 is sufficient, causes the flange 26 to be, at least partially, pulled away from the seat 22 to allow air from the bag to enter the valve assembly.

Initially, when the air enters the valve assembly, the flange 24 will resist being forced off its seat 21 by virtue of the valve closing bias provided by the inherent resilience of the flange causing the flange to forcibly engage the seat. However, as more air enters the valve the positive pressure differential will increase to the minimum level required to overcome the closing bias and the flange 24 will lift off the seat 21 allowing air to flow through the second valve, through the spaces 40 between the castellations in the flange 20, through the spaces 41 between the castellations in the neck 17 and out through the first valve. The first valve will reclose automatically when the positive pressure differential drops below said minimum level, e.g. as the second valve closes or the bag pressure falls, well before the positive pressure differential ceases to exist, thereby preventing air or contaminants entering the valve assembly from outside the bag.

The flange 26 is cranked and tapers in thickness to provide a well in which the lower end of the flange 20 is seated firmly to retain the common valve member 15 in the opening against the force exerted on it by the pneumatic pressure in the bag. However, said thickness and the form of the flange 26 are determined so that the flange can yield and be deflected in a radially inwards direction so as to pass through the opening in the event of said pressure reaching an excessive value because of malfunction of the valve, e.g. due to breakage or detachment of the tether.

Referring to FIG. 2, the lifting device 50 comprises a stack of bags, 51, 52, 53 and 54 secured together. The top bag 54 has one valve assembly 10 mounted on its upper panel 30, and further valves 10 are provided within the stack at the junctions 55 between adjacent bags to release pressurised air from the inferior to the superior bag at each junction. Each of the bags 52 to 54 has a manually actuable air valve or vent 58. The bottom bag 51 has an air inlet 56.

In use, the valve assemblies automatically ensure sequential inflation of the bags in ascending sequence, because, for example, the bag 52 cannot be inflated until he bag 51 has been inflated to the extent necessary to actuate the second valve and establish the predetermined positive pressure differential required to open the first valve of the assembly connecting the bags 51 and 52.

When the device is inflated to reach its maximum height, the valve assemblies 10 will retain the pressure in the bags 52 to 54. Pressure in the bottom bag may be retained by closing the air supply line to the inlet 56. If the bottom bag 51 is provided with a non-return valve 57 to prevent reverse flow through the inlet 56, and a valve or vent 58 is fitted also to the bottom bag to permit deflation of this bag.

The invention is not confined to details of the foregoing examples, and many variations and modifications are possible within the scope of the invention. For example, the panels may be linked by internal flexible inelastic webs 59 (FIG. 1) to limit the separation thereof.

The geometrical form of the valve member may be varied to suit any appropriate form of manufacture, provided that the modified form provides equivalent functions. For example the first head may be hollow and the second head solid; and the actuator formation may be attached to the latter to displace the flange 26 bodily to open the second valve. The actuator formation may be strong enough to pull the entire first head through the aperture when the formation is pulled hard enough by over expansion of the bag or bags 54.

The first valves may be varied in stiffness to vary, e.g. reduce, the positive pressure differential required to open them, e.g. to minimise the differential for opening the valves on bags 51, 52 and 53 leaving the uppermost valve on bag 54 only requiring a substantially higher pressure differential for opening of its first valve, whereby to minimise the pressure differences between the bags at full inflation of the stack.

The tether 33 of the valve 10 of the top bag 54 may pass through the bags 53 and 52 and may be attached at its lowest end directly to the bottom of the lowermost bag 51, so that only one valve 10 (the uppermost) is required to limit the overall height of the stack. Thus the valves of the bags 51, 52 and 53 may be omitted leaving air flow ports through which said tether 33 extends.

The invention further provides and includes a valve assembly or a pneumatically inflatable lifting device having any novel part, arrangement of parts or functional feature disclosed herein or in the accompanying drawings, or any mechanical or functional equivalent thereof.

What is claimed is:

1. An extendable or inflatable lifting device having a pressure release valve assembly (10); wherein the device comprises an enclosure having a first part (30) movable relative to second part (31) by applied fluid pressure; wherein the valve assembly (10) is mounted on one of the parts (30,31) and comprises a valve (13) exposed to pressure inside the enclosure and is attached to and actuable by an actuating tether (33) which is located in the enclosure and is attached to the other of said parts (30,31) to cause the valve (13) to open and release fluid from within the enclosure when the distance between the parts (30,31) reaches a limit determined by the length of the tether (33); and characterised in that the valve (13) which is actuated by the tether is a second valve (13) of the assembly (10) which second valve (13) releases fluid into the valve assembly (10) to actuate a first valve (12), which first valve (12) is arranged to open automatically only when the pressure within the valve assembly (10) is greater than the pressure outside the enclosure.

2. A device as claimed in claim 1 wherein the enclosure is in the form of a bag, in which said parts (30,31) are flexible.

3. A device as claimed in claim 1 wherein the enclosure is in the form of a bellows, in which said parts (30,31) are rigid panels.

4. A device as claimed in claim 1, 2 or 3 wherein the valve assembly (10) serves also as an emergency or safety pressure release valve in the event of the second valve (13) not functioning.

5. A device as claimed in claim 4 wherein the valve assembly (10) comprises a valve member (15) which is common to both valves (12,13) and provides two independently movable parts, each of which forms a part of one of the other of the valves (12,13).

6. A device as claimed in claim 1 wherein the valve assembly (10) further comprises a rigid mounting (14) and a valve member (15) is located in an opening in the mounting; wherein an annular part (16) of the mounting around the opening provides a first valve seat (21) on one side thereof and a second valve seat (22) on the other side thereof; wherein the valve member (15) comprises a first head (23) joined to a second head (25) by a neck (17) which extends through the aperture; wherein the first head (23) has a resilient flange (24) which resiliently engages the first valve seat to form said first valve (12) and the second head (25) has a resilient flange (26) which resiliently engages the second seat (22) to form said second valve (13); and wherein the flange (26) of the second head has an actuator formation (27) thereon which is movable by the actuator (27,33) to move at least part of this flange off the second seat whereby, in use, to allow fluid under pressure to flow past this flange into the opening for automatically lifting the flange of the first head (23) off the first seat (21) when the fluid pressure in the opening is greater than the fluid pressure at said one side of the mounting (14).

7. A device as claimed in claim 6 wherein the pressure exerted by the first head (23) on the first seat (21) is substantial so that a considerable minimum positive pressure differential across the first valve (12) is necessary before the valve will open, and so that when the differential falls to or below said minimum positive pressure differential said first valve closes automatically to retain pressure within the opening even when the second valve (13) is open.

8. A device as claimed in claim 6 or 7 wherein the valve member (15) can be at least partially removed from the valve assembly (10) by excessive differential pressure.

9. A device as claimed in claim 6 or 7 wherein the valve member (15) includes a frangible diaphragm in the first head (23) which ruptures when subjected to an excessive pressure differential.

* * * * *